United States Patent
Koifman

(10) Patent No.: US 12,342,091 B2
(45) Date of Patent: *Jun. 24, 2025

(54) IMAGE SENSOR WITH STACKED PIXELS HAVING HIGH DYNAMIC RANGE AND LOW NOISE

(71) Applicant: Apple Inc., Cupertino, CA (US)

(72) Inventor: Vladimir Koifman, Rishon LeZion (IL)

(73) Assignee: Apple Inc., Cupertino, CA (US)

(*) Notice: Subject to any disclaimer, the term of this patent is extended or adjusted under 35 U.S.C. 154(b) by 110 days.

This patent is subject to a terminal disclaimer.

(21) Appl. No.: 18/335,157

(22) Filed: Jun. 15, 2023

(65) Prior Publication Data

US 2024/0098386 A1 Mar. 21, 2024

Related U.S. Application Data

(60) Provisional application No. 63/406,741, filed on Sep. 15, 2022.

(51) Int. Cl.
*H04N 25/77* (2023.01)
*H04N 25/78* (2023.01)

(52) U.S. Cl.
CPC ............. *H04N 25/77* (2023.01); *H04N 25/78* (2023.01)

(58) Field of Classification Search
None
See application file for complete search history.

(56) References Cited

U.S. PATENT DOCUMENTS

| | | |
|---|---|---|
| 5,144,442 A | 9/1992 | Ginossar et al. |
| 8,169,517 B2 | 5/2012 | Poonnen et al. |
| 8,606,009 B2 | 12/2013 | Sun |
| 9,344,635 B2 | 5/2016 | Vogelsang et al. |
| 9,571,774 B2 | 2/2017 | Koifman et al. |

(Continued)

FOREIGN PATENT DOCUMENTS

| | | |
|---|---|---|
| DE | 102021209943 A1 | 3/2022 |
| EP | 2123019 B1 | 9/2019 |

(Continued)

OTHER PUBLICATIONS

Shukri, "Apple's Newest iPhone Three Camera System is "Campacked"," Image Sensors Technology, TechInsights Inc., pp. 1-10, year 2023.

(Continued)

*Primary Examiner* — Mark T Monk
(74) *Attorney, Agent, or Firm* — Meitar Patents Ltd.; Daniel Kligler

(57) ABSTRACT

An image sensor includes a logic die, including column readout circuits and bitlines connected to the column readout circuits. A sensor die is overlaid on the logic die. The image sensor includes an array of detector elements, each including a sensing circuit on the sensor die, which includes a photodiode, a floating diffusion node connected to one of the terminals of the photodiode, a reset transistor coupled to the floating diffusion node, and a source follower transistor. In each detector element, a pixel circuit on the logic die includes a select transistor, which has an input coupled to the output of the source follower and an output coupled to one of the bitlines. A current memory circuit is coupled to the input of the select transistor and is configured to sense and output a signal indicative of a level of noise in the detector element.

18 Claims, 3 Drawing Sheets

(56) References Cited

U.S. PATENT DOCUMENTS

| | | | |
|---|---|---|---|
| 10,250,832 B1 | 4/2019 | Xu et al. | |
| 10,798,322 B2 | 10/2020 | Smith et al. | |
| 10,859,434 B2 | 12/2020 | Panicacci | |
| 2014/0159702 A1 | 6/2014 | Doege | |
| 2016/0240572 A1 | 8/2016 | Koifman et al. | |
| 2016/0269661 A1 | 9/2016 | Hseih et al. | |
| 2017/0118430 A1 | 4/2017 | Koifman et al. | |
| 2018/0227516 A1 | 8/2018 | Mo et al. | |
| 2018/0227523 A1* | 8/2018 | Mo | H10F 39/182 |
| 2020/0382726 A1* | 12/2020 | Inaoka | H04N 25/77 |
| 2023/0011827 A1 | 1/2023 | Cho et al. | |
| 2024/0098379 A1* | 3/2024 | Koifman | H04N 25/79 |

FOREIGN PATENT DOCUMENTS

| | | |
|---|---|---|
| KR | 20200098764 A | 8/2020 |
| WO | 2023018841 A9 | 2/2023 |

OTHER PUBLICATIONS

Spivak et al., "Wide-Dynamic-Range CMOS Imaging Devices—Comparative Performance Analysis", IEEE Transactions on Electron Devices, vol. 56, No. 11, pp. 2446-2461, Nov. 2009.

Wikipedia, "Internet of Things (IoT)," pp. 1-53, latest edit Apr. 18, 2023.

Robidoux et al., "End-to-end High Dynamic Range Camera Pipeline Optimization," Conference Paper, Conference on Computer Vision and Pattern Recognition (CVPR) 2021, pp. 1-11, year 2021.

Ernst et al., "HDR+ with Bracketing on PixelPhones," Blog, Google Research, pp. 1-8, Apr. 23, 2021, as downloaded from as downloaded from https://blog.research.google/2021/04/hdr-with-bracketing-on-pixel-phones.html.

Koifman, U.S. Appl. No. 18/322,629, filed May 24, 2023.

Koifman, U.S. Appl. No. 18/337,001, filed Jun. 18, 2023.

Panicacci et al., U.S. Appl. No. 18/353,085, filed Jul. 16, 2023.

* cited by examiner

IMAGE SENSOR WITH STACKED PIXELS HAVING HIGH DYNAMIC RANGE AND LOW NOISE

CROSS-REFERENCE TO RELATED APPLICATION

This application claims the benefit of U.S. Provisional Patent Application 63/406,741, filed Sep. 15, 2022, which is incorporated herein by reference.

FIELD OF THE INVENTION

The present invention relates generally to optoelectronic devices, and particularly to image sensors.

BACKGROUND

The large majority of image sensors currently in use are CMOS (complementary metal-oxide-semiconductor) active-pixel sensor (APS) monolithic arrays, with 4T pixels. In these devices, each detector element (referred to as a "pixel") comprises a photodiode, a floating diffusion, and four CMOS transistors, including a transfer gate, reset gate, selection gate, and source-follower readout transistor. The transfer gate controls charge transfer from the photodiode to the floating diffusion and enables noise reduction by correlated double sampling (CDS). Image sensors using 3T pixels, without the transfer gate, are easier to fabricate and less prone to artifacts, but generally suffer from higher noise.

SUMMARY

Embodiments of the present invention that are described hereinbelow provide improved image sensors and methods for producing and controlling such image sensors.

There is therefore provided, in accordance with an embodiment of the invention, an image sensor, which includes a logic die, including column readout circuits and bitlines connected to the column readout circuits, and a sensor die, overlaid on the logic die. The image sensor includes an array of detector elements, each detector element including a sensing circuit, which is disposed on the sensor die, and a pixel circuit, which is disposed on the logic die. The sensing circuit includes a photodiode having cathode and anode terminals, a floating diffusion node connected to one of the terminals of the photodiode, a reset transistor coupled between the floating diffusion node and a reset voltage, and a source follower transistor having an input connected to the floating diffusion node and an output. The pixel circuit includes a select transistor, which has an input coupled to the output of the source follower and an output coupled to one of the bitlines, and a current memory circuit, which is coupled to the input of the select transistor and is configured to sense and output a signal indicative of a level of noise in the detector element.

In some embodiments, each sensing circuit includes a lateral overflow integration capacitor (LOFIC) circuit, including one or more charge storage capacitors and one or more LOFIC transistors coupled between the floating diffusion node and the charge storage capacitors, wherein the reset transistor is coupled between the LOFIC circuit and the reset voltage. In a disclosed embodiment, the LOFIC circuit includes a first charge storage capacitor having a first capacitance, a second charge storage capacitor having a second capacitance greater than the first capacitance, a first LOFIC transistor connected between the floating diffusion node and a first charge input terminal of the first charge storage capacitor, and a second LOFIC transistor connected between the first charge input terminal of the first charge storage capacitor and a second charge input terminal of the second charge storage capacitor. In one embodiment, the reset transistor is connected between the second charge input terminal of the second charge storage capacitor and the reset voltage. Additionally or alternatively, during readout of the detector element to the bitline, the first and second LOFIC transistors are switched on sequentially while the select transistor is switched on.

In some embodiments, during each image frame, the reset transistor is switched on in a first reset period to reset the floating diffusion node prior to an exposure period of the frame, and the select transistor is switched on in a first readout period, following the exposure period, so as to read out photocharge from the floating diffusion node. The reset transistor is then switched on in a second reset period, following the first select period, to reset the floating diffusion node, and the select transistor is switched in at a second readout period, following the second reset time, to read out noise accumulated by the detector element.

In some embodiments, the current memory circuit includes at least one sampling capacitor and at least one sampling transistor, coupled between the input of the select transistor and the at least one sampling capacitor, wherein the at least one sampling transistor is switched on following the reset transistor in the first and second reset periods so that the at least one sampling capacitor samples kTC noise in the detector element. In a disclosed embodiment, the current memory circuit includes a read transistor connected between the input of the select transistor and the at least one sampling transistor, and a bias transistor having a polarity opposite to the read transistor and connected in parallel with the read transistor, wherein the read transistor and the bias transistor are switched on during the first and second readout periods and are switched off during the exposure period. In one embodiment, the bias transistor is switched on during the first and second reset periods.

Additionally or alternatively, the at least one sampling capacitor includes first and second sampling capacitors, and the at least one sampling transistor includes first and second sampling transistors, which are coupled in series between the first and second sampling capacitors and the input of the select transistor.

There is also provided, in accordance with an embodiment of the invention, a method for image sensing, which includes providing a logic die, including column readout circuits and bitlines connected to the column readout circuits, and overlaying on the logic die a sensor die. An array of detector elements is formed on the sensor die and the logic die, each detector element including a sensing circuit, which is formed on the sensor die. and a pixel circuit, which is formed on the logic die. Each sensing circuit includes a photodiode having cathode and anode terminals, a floating diffusion node connected to one of the terminals of the photodiode, a reset transistor coupled between the floating diffusion node and a reset voltage, and a source follower transistor having an input connected to the floating diffusion node and an output. Each pixel circuit includes a select transistor, which has an input coupled to the output of the source follower, and an output coupled to one of the bitlines, and a current memory circuit, which is coupled to the input of the select transistor and is configured to sense and output a signal indicative of a level of noise in the detector element.

The present invention will be more fully understood from the following detailed description of the embodiments thereof, taken together with the drawings in which:

DETAILED DESCRIPTION OF EMBODIMENTS

Embodiments of the present invention that are described herein provide image sensors comprising 3T pixels of a novel design that achieves high dynamic range with low noise and without the artifacts that can occur in conventional 4T pixel arrays. The image sensor comprises a sensor die stacked on a logic die. Each 3T pixel comprises a sensing circuit on the sensor die, including a photodiode and a lateral overflow integration capacitor (LOFIC) circuit to enable sensing over a wide range of lighting conditions, from indoors to bright sunlight, without automatic exposure control. In addition, each pixel comprises a pixel circuit on the logic die, which includes a current memory circuit. The current memory circuit is used in sensing the level of noise in the detector element. Signals output by the current memory circuit enable suppression of thermal (kTC) noise using CDS.

Although the current memory circuit on the logic die is particularly useful in conjunction with the LOFIC circuit, in alternative embodiments the components on the logic die can be used to reduce noise in other image sensor pixels even without a LOFIC circuit.

Figure 1:
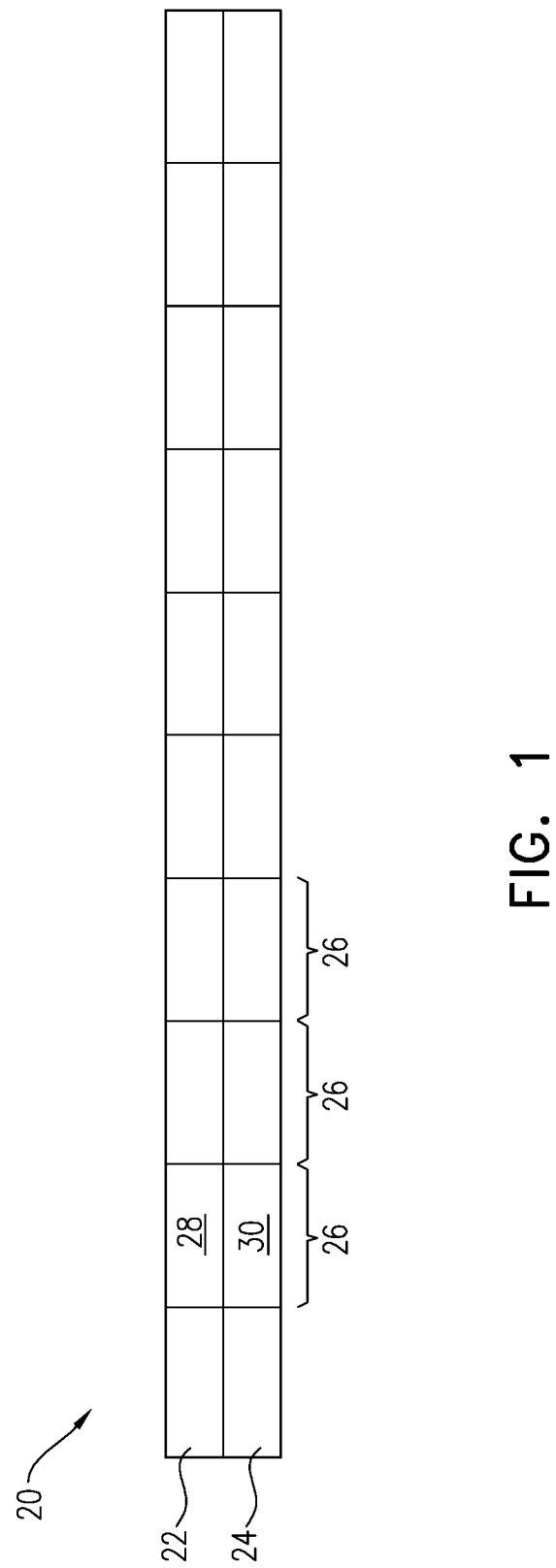
FIG. 1 is a schematic side view of an image sensor, in accordance with an embodiment of the invention.
Figure 2:
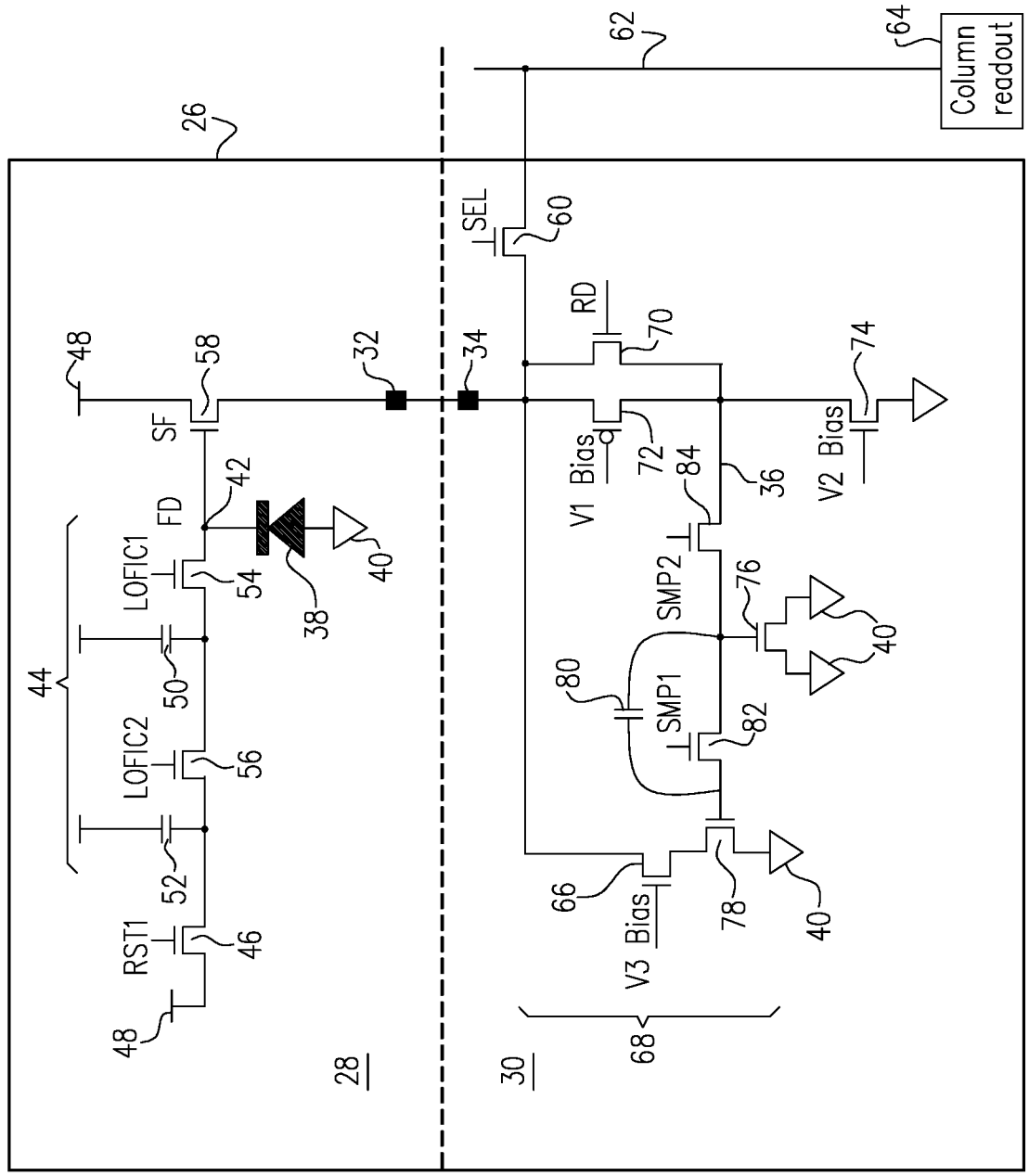
FIG. 2 is a schematic circuit diagram showing details of a detector element in an image sensor, in accordance with an embodiment of the invention.

FIG. 1 is a schematic side view of an image sensor 20, in accordance with an embodiment of the invention. Image sensor 20 comprises a logic die 24, made from a first silicon wafer, and a sensor die 22, made from a second silicon wafer, overlaid on logic die 24. Image sensor 20 comprises an array of detector elements 26, also referred to as pixels, each comprising a sensing circuit 28 on sensor die 22 and a pixel circuit 30 on logic die 24. Pixel circuits 30 are connected by bitlines to column readout circuits (as shown in FIG. 2). The stacked wafer configuration of image sensor 20 makes it possible to use standard CMOS control and readout circuits in logic die 24, while sensing circuits 28 may be fabricated by a different process. Alternatively, sensor die 22 may comprise another semiconductor material, rather than silicon.

FIG. 2 is a schematic circuit diagram showing details of one of detector elements 26, in accordance with an embodiment of the invention. Sensing circuit 28 is shown in FIG. 2 as comprising N-channel MOSFET transistors and an N-on-P photodiode 38. Alternatively, sensing circuit 28 may comprise P-channel transistors and P-on-N photodiodes. The components of sensing circuit 28 are connected to a supply voltage 48, for example 1.5 V, 1.2 V, or 1.0 V. There is no need in this design for boosting voltages above the supply voltage or below the ground potential.

Sensing circuit 28 comprises a floating diffusion node (FD) 42 connected to one of the terminals of photodiode 38 (in this case to the cathode, with the anode connected to a ground 40). A lateral overflow integration capacitor (LO-FIC) circuit 44 is coupled to floating diffusion node 42, and a reset transistor (RST1) 46 is coupled between the LOFIC circuit and a reset voltage (which is taken to be supply voltage 48 in the pictured example).

LOFIC circuit 44 in the present example comprises two charge storage capacitors 50, 52 and two LOFIC transistors (LOFIC1 and LOFIC2) 54, 56 coupled in series to floating diffusion node 42. The first LOFIC transistor (LOFIC1) 54 connects the floating diffusion node to the charge input terminal of the first charge storage capacitor 50, which has a small capacitance, for example about 20 fF. The second LOFIC transistor 56 connects the charge input terminal of this first charge storage capacitor 50 to the charge input terminal of the second charge storage capacitor 52, which has a larger capacitance, for example about 500 fF. In this configuration, floating diffusion node 42 itself will be used to store and read out photocharge in low-light conditions; charge storage capacitor 50 will be used to store and read out photocharge in intermediate conditions; and charge storage capacitor 52 will be used to store and read out photocharge in conditions of bright light. This LOFIC configuration enables detector element 26 to sense light over a dynamic range of about 120 dB. Alternatively, other LOFIC configurations may be used, with smaller or larger numbers of capacitors and transistors.

A source follower transistor (SF) 58 has its gate connected to receive a charge input from floating diffusion node 42 and its drain connected to an output terminal 32, which is bonded to an input terminal 34 of pixel circuit 30. Input terminal 34 is connected to a select transistor (SEL) 60. When the select transistor is turned on, it outputs a signal from detector element 26 to a bitline 62, which serves a column of the array of detector elements. As noted above, this bitline connects the detector elements in sensor die 22 to a column readout circuit 64 in logic die 24. During readout from detector element 26, a bias transistor (V3 Bias) 66 connected to input terminal 34 is closed, typically drawing a current of about 1 μA.

For purposes of noise sensing and cancellation, pixel circuit 30 comprises a current memory circuit 68 including an N-channel read transistor (RD) 70 in parallel with a P-channel bias transistor (V1 Bias) 72. The read transistor and bias transistor in this example have opposite polarities. Thus, in the pictured example, read transistor 70 (and the other components of pixel circuit 30) is an N-channel device, while V1 Bias transistor 72 is a P-channel device. A second bias transistor (V2 Bias) 74 is connected in series with the P-channel bias transistor and draws a bias current, for example about 100 nA, when the two bias transistors are switched on.

A sampling line 36 is connected to the drains of read transistor 70 and V1 Bias transistor 72 and the source of V2 Bias transistor 74. The current flowing from detector element 26 is sampled by a pair of sampling capacitors 76, 78, which are connected between sampling line 36 and ground 40. These sampling capacitors 76, 78 can have a low capacitance, for example about 4 fF each, with additional parasitic coupling 80 between the two sampling capacitors on the order of 0.1 fF.

To sample the current flowing from sensing circuit 28 during reset of the sensing circuit, a pair of sampling transistors (SMP1 and SMP2) 82, 84 are briefly turned on together. Transistor 82 (SMP1) is then turned off, followed by turning off transistor 84 (SMP2). Transistor 82 samples the kTC noise of detector element 26, while transistor 84 samples the residual error after transistor 82 is turned off.

Thus, the kTC noise is sampled and compensated for by the current flowing to and from sampling capacitor 78.

During readout from detector element 26, the sampled current signal is read out to bitline 62 by select transistor 60.

Alternatively, current memory circuit 68 may comprise only a single sampling capacitor or a larger number of sampling capacitors, with one or more sampling transistors arranged accordingly.

Figure 3:
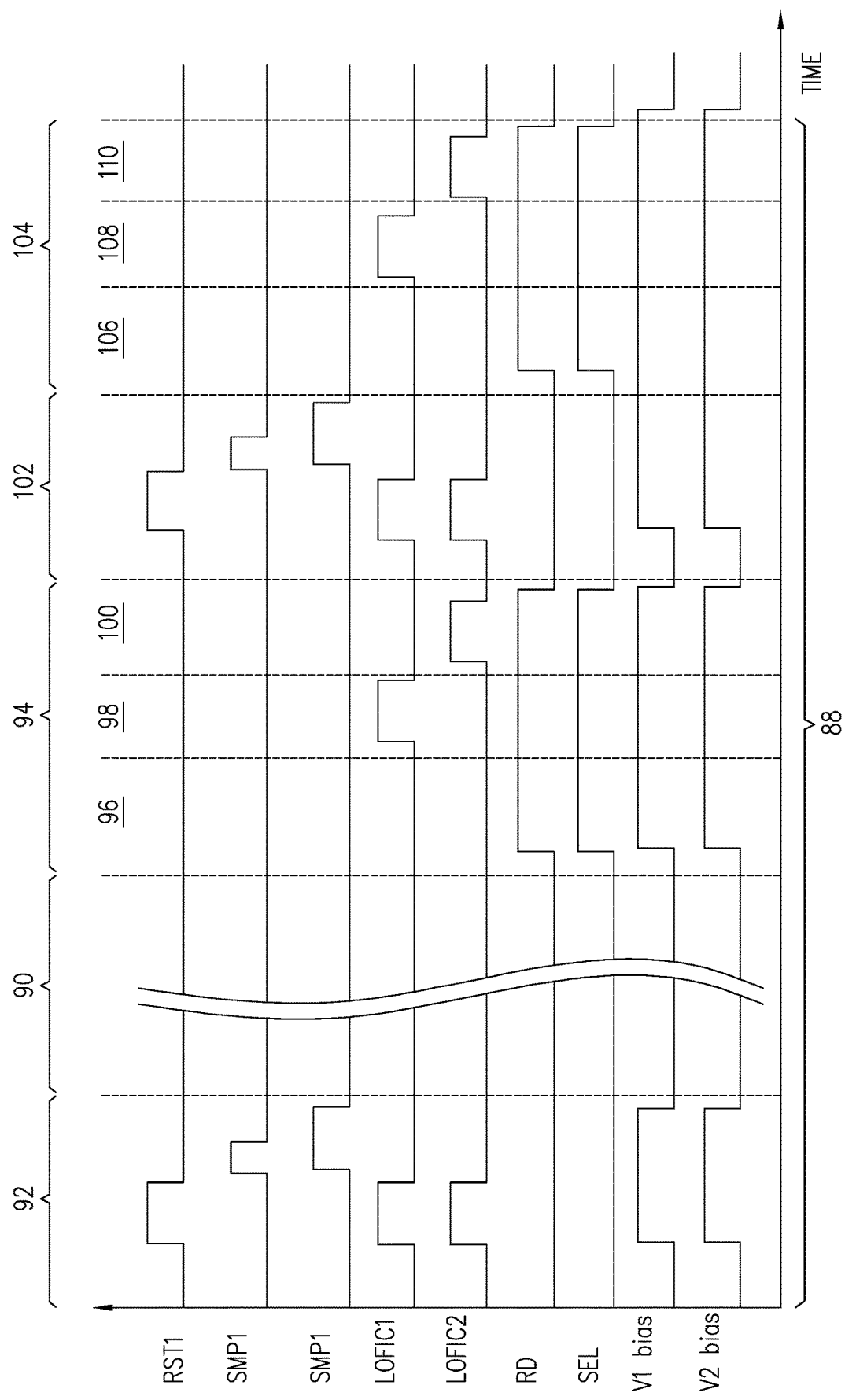
FIG. 3 is a timing diagram that schematically shows signals applied to the transistors of the detector element of FIG. 2, in accordance with an embodiment of the invention.

FIG. 3 is a timing diagram that schematically shows signals applied to transistors 46, 54, 56, 66, 70, 72, 74, 82 and 84 of detector element 26 in the course of a single image frame 88, in accordance with an embodiment of the invention. For simplicity of illustration, the V1 Bias signal applied to transistor 72 is shown as having the same polarity as the other signals; but in practice the polarity of the V1 Bias signal will be opposite to that of the other signals, since V1 Bias transistor 72 is a P-channel device. The V3 Bias signal applied to transistor 66 is identical to the V2 Bias signal and is therefore omitted for the sake of simplicity.

Each image frame 88 includes an exposure period 90, for example in the range of 1-10 ms, during which photocharge from the photodiode is collected at floating diffusion node 42 and possibly on one or both of the LOFIC charge storage capacitors 50, 52, depending on the intensity of the incident light. In a pre-exposure reset period 92 prior to exposure period 90, reset transistor (RST1) 46 is switched on to reset floating diffusion node 42. LOFIC transistors 54, 56 are also switched on together with RST1 to reset LOFIC charge storage capacitors 50, 52. In addition, during the reset period prior to the exposure period, bias transistors 72, 74, 66 in pixel circuit 30 (V1 Bias, V2 Bias, and V3 Bias) are all switched on, and sampling transistors 82, 84 (SMP1 and SMP2) are switched on following the RST1 reset pulse and then switched off in sequence.

Following exposure period 90, select transistor 60 and read transistor 70 (SEL and RD) are switched on during a readout period 94, along with the three bias transistors 72, 74, 66 (V1 Bias, V2 Bias, and V3 Bias), to read out photocharge from floating diffusion node 42 to bitline 62. Readout period 94 comprises a high-gain interval 96, followed by a medium-gain interval 98 and then a low-gain interval 100. While select transistor 60 is switched on, the charge on floating diffusion node 42 is first read out during high-gain interval 96. LOFIC transistors 54 and 56 are then switched on sequentially during medium-gain interval 98 and low-gain interval 100 to read out the photocharge stored in LOFIC charge storage capacitors 50 and 52 to bitline 62.

After all photocharges have been read out, reset transistor (RST1) 46 is switched on for a second time, together with the two LOFIC transistors 54, 56 in a post-exposure reset period 102, to reset floating diffusion node 42 and LOFIC charge storage capacitors 54, 56. Bias transistors 72, 74, 66 in pixel circuit 30 (V1 Bias, V2 Bias, and V3 Bias) are again all switched on, and sampling transistors 82, 84 (SMP1 and SMP2) are switched on following the RST1 reset pulse and then switched off in sequence, as they were during reset period 92.

Following these resets, select transistor 60 and read transistor 70 are switched on again during a noise readout period 104 to read out noise accumulated by detector element 26. Noise readout period 104 comprises a high-gain interval 106, followed by a medium-gain interval 108 and then a low-gain interval 110. While select transistor 60 and read transistor 70 are switched on, the charge on floating diffusion node 42 is first read out during high-gain interval 106. LOFIC transistors 54 and 56 are then switched on sequentially during medium-gain interval 108 and low-gain interval 110 to read out the charge remaining in LOFIC charge storage capacitors 52 and 54 to bitline 62.

During noise readout period 104, bias transistors 72, 74 and 66 remain switched on. Current memory circuit 68 senses and outputs a signal indicative of the level of noise in detector element 26. CDS circuits (not shown) in logic die 24 subtract the noise signals read out during this second readout period from the light signals read out following the exposure period and thus reduce the effect of noise in the output signals from image sensor 20.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An image sensor comprising:
   a logic die, comprising column readout circuits and bitlines connected to the column readout circuits;
   a sensor die, overlaid on the logic die; and
   an array of detector elements, each detector element comprising:
      a sensing circuit, which is disposed on the sensor die and comprises:
         a photodiode having cathode and anode terminals;
         a floating diffusion node connected to one of the terminals of the photodiode;
         a reset transistor coupled between the floating diffusion node and a reset voltage; and
         a source follower transistor having an input connected to the floating diffusion node and an output;
      a pixel circuit, which is disposed on the logic die and comprises:
         a select transistor, which has an input coupled to the output of the source follower and an output coupled to one of the bitlines; and
         a current memory circuit, which is coupled to the input of the select transistor and is configured to sense and output a signal indicative of a level of noise in the detector element; and
      a lateral overflow integration capacitor (LOFIC) circuit, comprising one or more charge storage capacitors and one or more LOFIC transistors coupled between the floating diffusion node and the charge storage capacitors, wherein the reset transistor is coupled between the LOFIC circuit and the reset voltage.

2. The image sensor according to claim 1, wherein the LOFIC circuit comprises:
   a first charge storage capacitor having a first capacitance;
   a second charge storage capacitor having a second capacitance greater than the first capacitance;
   a first LOFIC transistor connected between the floating diffusion node and a first charge input terminal of the first charge storage capacitor; and
   a second LOFIC transistor connected between the first charge input terminal of the first charge storage capacitor and a second charge input terminal of the second charge storage capacitor.

3. The image sensor according to claim 2, wherein the reset transistor is connected between the second charge input terminal of the second charge storage capacitor and the reset voltage.

4. The image sensor according to claim 2, wherein during readout of the detector element to the bitline, the first and second LOFIC transistors are switched on sequentially while the select transistor is switched on.

5. An image sensor comprising:
a logic die, comprising column readout circuits and bitlines connected to the column readout circuits;
a sensor die, overlaid on the logic die; and
an array of detector elements, each detector element comprising:
a sensing circuit, which is disposed on the sensor die and comprises:
a photodiode having cathode and anode terminals;
a floating diffusion node connected to one of the terminals of the photodiode;
a reset transistor coupled between the floating diffusion node and a reset voltage; and
a source follower transistor having an input connected to the floating diffusion node and an output; and
a pixel circuit, which is disposed on the logic die and comprises:
a select transistor, which has an input coupled to the output of the source follower and an output coupled to one of the bitlines; and
a current memory circuit, which is coupled to the input of the select transistor and is configured to sense and output a signal indicative of a level of noise in the detector element,
wherein during each image frame, the reset transistor is switched on in a first reset period to reset the floating diffusion node prior to an exposure period of the frame, and
the select transistor is switched on in a first readout period, following the exposure period, so as to read out photocharge from the floating diffusion node, and
the reset transistor is switched on in a second reset period, following the first select period, to reset the floating diffusion node, and
the select transistor is switched in at a second readout period, following the second reset time, to read out noise accumulated by the detector element.

6. The image sensor according to claim 5, wherein the current memory circuit comprises:
at least one sampling capacitor; and
at least one sampling transistor, coupled between the input of the select transistor and the at least one sampling capacitor,
wherein the at least one sampling transistor is switched on following the reset transistor in the first and second reset periods so that the at least one sampling capacitor samples kTC noise in the detector element.

7. The image sensor according to claim 6, wherein the current memory circuit comprises:
a read transistor connected between the input of the select transistor and the at least one sampling transistor; and
a bias transistor having a polarity opposite to the read transistor and connected in parallel with the read transistor,
wherein the read transistor and the bias transistor are switched on during the first and second readout periods and are switched off during the exposure period.

8. The image sensor according to claim 7, wherein the bias transistor is switched on during the first and second reset periods.

9. The image sensor according to claim 6, wherein the at least one sampling capacitor comprises first and second sampling capacitors, and the at least one sampling transistor comprises first and second sampling transistors, which are coupled in series between the first and second sampling capacitors and the input of the select transistor.

10. A method for image sensing, comprising:
providing a logic die, comprising column readout circuits and bitlines connected to the column readout circuits;
overlaying on the logic die a sensor die; and
forming an array of detector elements on the sensor die and the logic die, each detector element comprising:
a sensing circuit, which is formed on the sensor die and comprises:
a photodiode having cathode and anode terminals;
a floating diffusion node connected to one of the terminals of the photodiode;
a reset transistor coupled between the floating diffusion node and a reset voltage; and
a source follower transistor having an input connected to the floating diffusion node and an output; and
a pixel circuit, which is formed on the logic die and comprises:
a select transistor, which has an input coupled to the output of the source follower, and an output coupled to one of the bitlines; and
a current memory circuit, which is coupled to the input of the select transistor and is configured to sense and output a signal indicative of a level of noise in the detector element; and
coupling a lateral overflow integration capacitor (LOFIC) circuit between the floating diffusion node and the reset transistor in each sensing circuit, the LOFIC circuit comprising one or more charge storage capacitors and one or more LOFIC transistors coupled between the floating diffusion node and the charge storage capacitors, wherein the reset transistor is coupled between the LOFIC circuit and the reset voltage.

11. The method according to claim 10, wherein the LOFIC circuit comprises:
a first charge storage capacitor having a first capacitance;
a second charge storage capacitor having a second capacitance greater than the first capacitance;
a first LOFIC transistor connected between the floating diffusion node and a first charge input terminal of the first charge storage capacitor; and
a second LOFIC transistor connected between the first charge input terminal of the first charge storage capacitor and a second charge input terminal of the second charge storage capacitor.

12. The method according to claim 11, wherein coupling the LOFIC circuit comprises connecting the reset transistor between the second charge input terminal of the second charge storage capacitor and the reset voltage.

13. The method according to claim 11, and comprising, during readout of the detector element to the bitline, switching on the first and second LOFIC transistors sequentially while the select transistor is switched on.

14. The method according to claim 10, and comprising, during each image frame:
switching on the reset transistor in a first reset period to reset the floating diffusion node prior to an exposure period of the frame;

switching on the select transistor in a first readout period, following the exposure period, so as to read out photocharge from the floating diffusion node;

switching on the reset transistor is switched on in a second reset period, following the first select period, to reset the floating diffusion node; and switching on the select transistor in at a second readout period, following the second reset time, to read out noise accumulated by the detector element.

15. The method according to claim 14, wherein the current memory circuit comprises:

at least one sampling capacitor; and at least one sampling transistor, coupled between the input of the select transistor and the at least one sampling capacitor, wherein the method comprises switching on the at least one sampling transistor following the reset transistor in the first and second reset periods so that the at least one sampling capacitor samples kTC noise in the detector element.

16. The method according to claim 15, wherein the current memory circuit comprises:

a read transistor connected between the input of the select transistor and the at least one sampling transistor; and a bias transistor having a polarity opposite to the read transistor and connected in parallel with the read transistor, wherein the method comprises switching on the read transistor and the bias transistor during the first and second readout periods and switching off the read transistor and the bias transistor during the exposure period.

17. The method according to claim 16, and comprising switching on the bias transistor during the first and second reset periods.

18. The method according to claim 15, wherein the at least one sampling capacitor comprises first and second sampling capacitors, and the at least one sampling transistor comprises first and second sampling transistors, which are coupled in series between the first and second sampling capacitors and the input of the select transistor.

* * * * *